Dec. 8, 1925.　　　　　　　　　　　　　　　　　　　　1,564,479
M. B. GROUT
WINDING MACHINE
Original Filed June 3, 1922　　7 Sheets-Sheet 1

Inventor:
Martin B. Grout.
By Curtis B....
Attorney

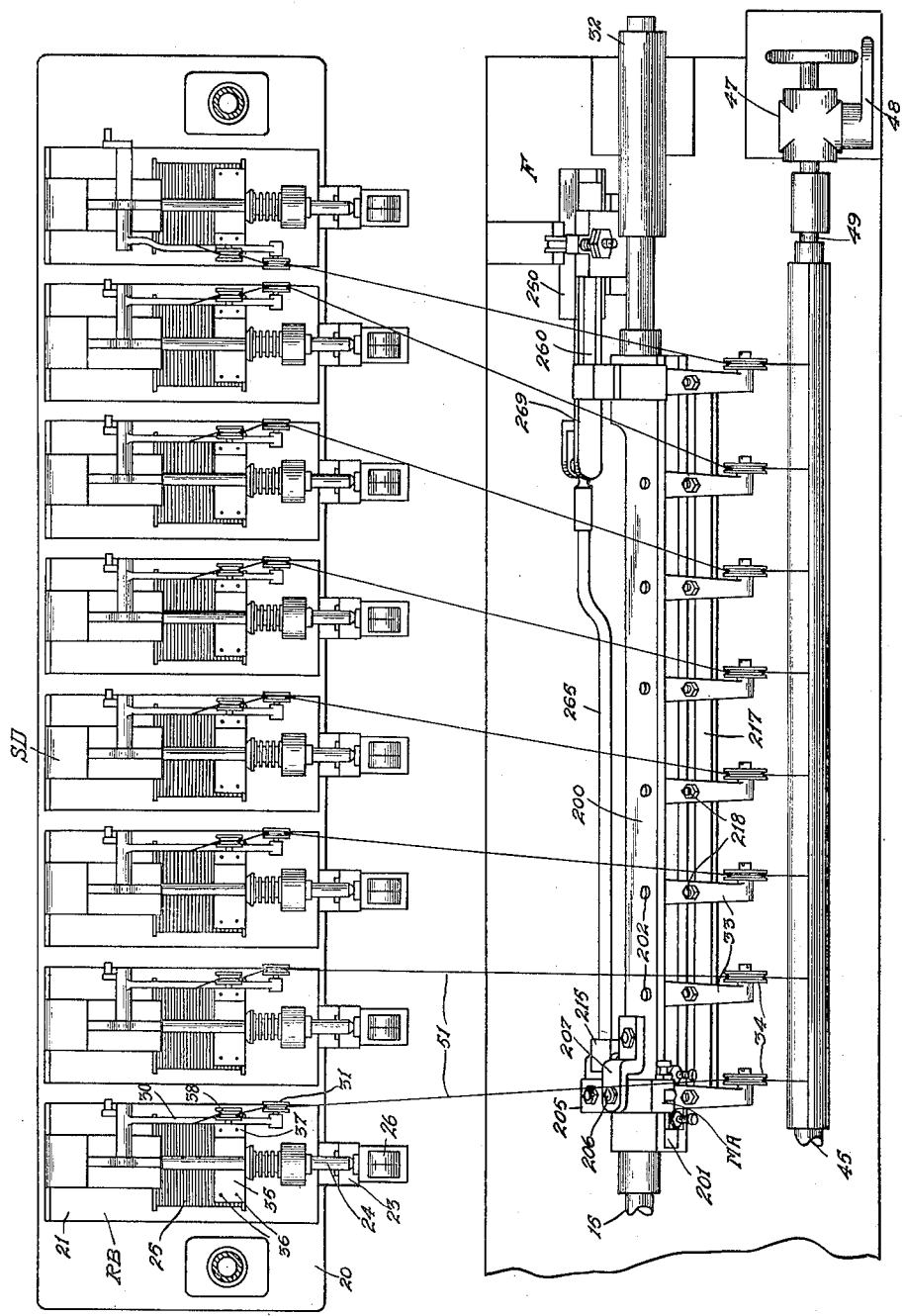

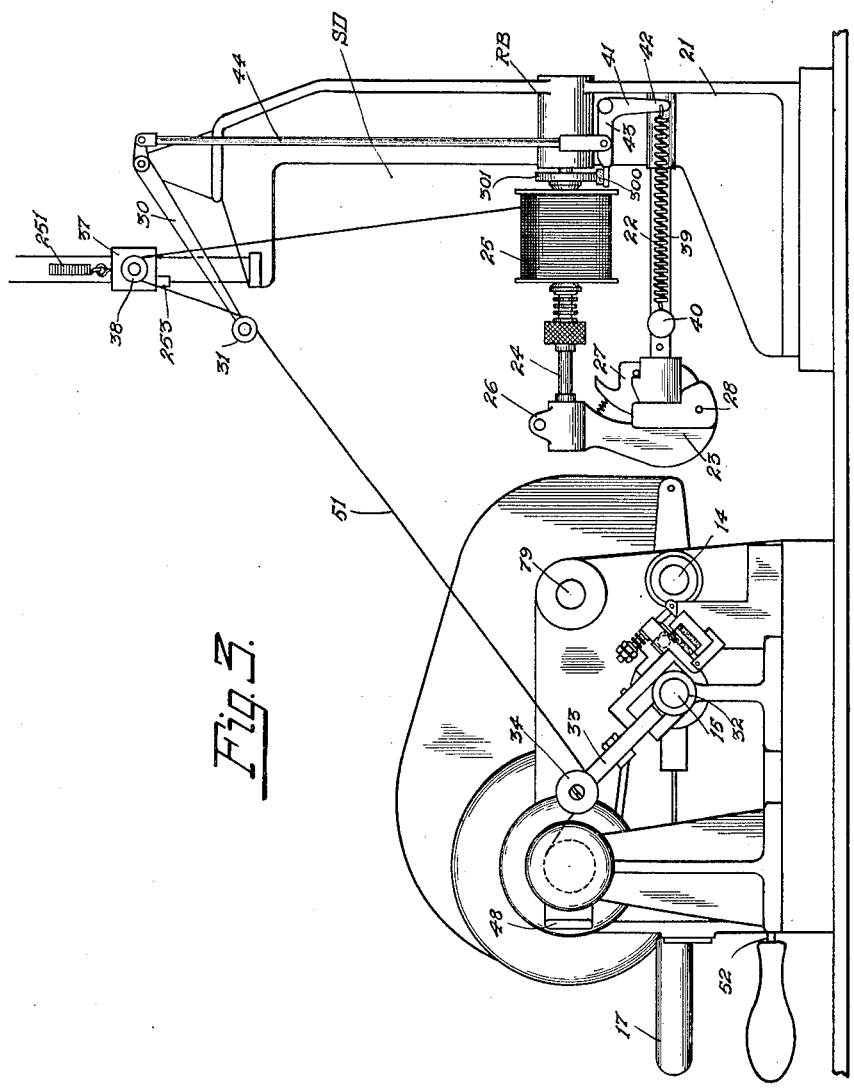

Dec. 8, 1925.
M. B. GROUT
1,564,479
WINDING MACHINE
Original Filed June 3, 1922   7 Sheets-Sheet 4
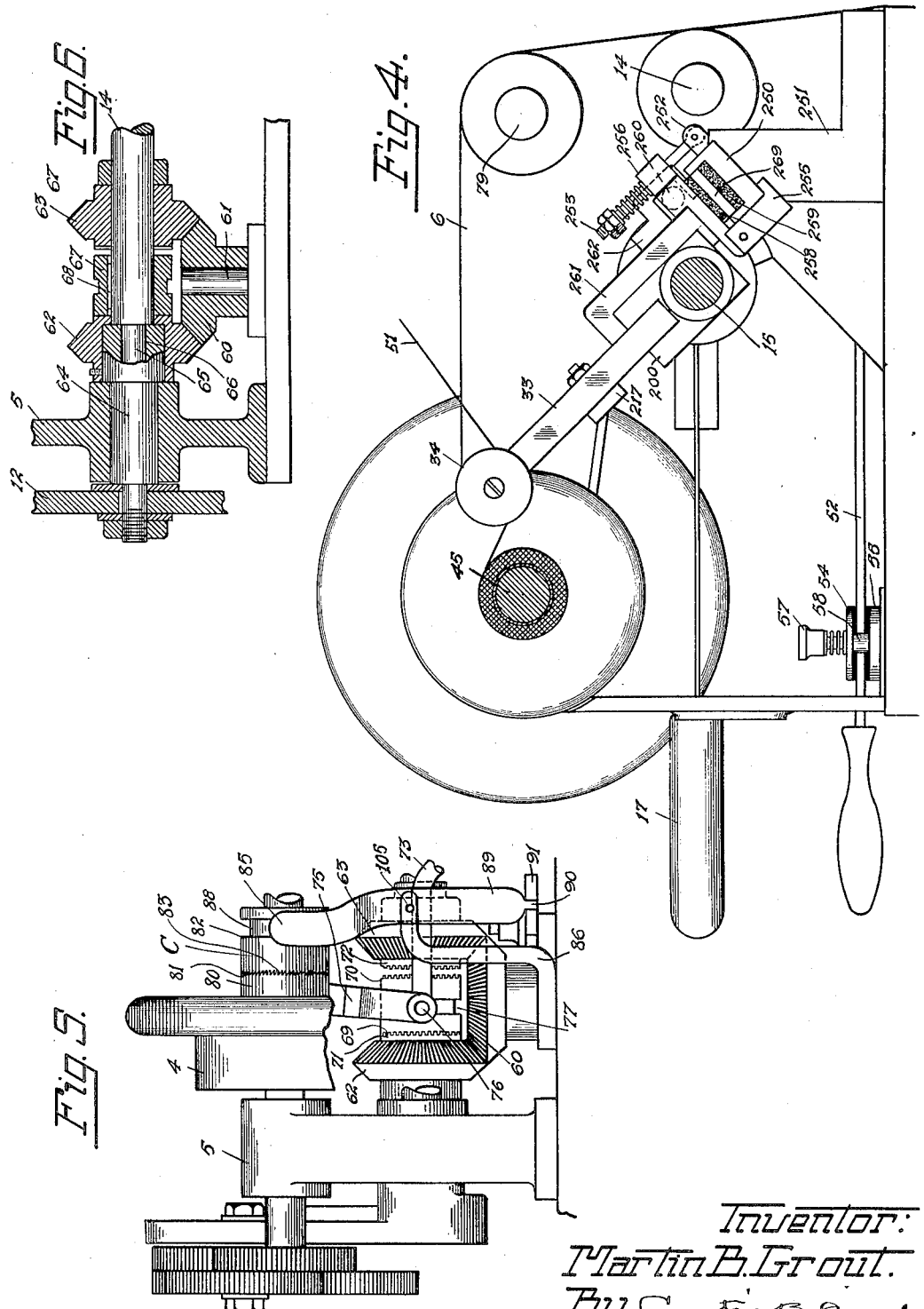
Inventor:
Martin B. Grout.
By Curtis B. Camp.
Attorney Dec. 8, 1925.  1,564,479

M. B. GROUT

WINDING MACHINE

Original Filed June 3, 1922   7 Sheets-Sheet 5

Inventor:
Martin B. Grout.
By [signature]
Attorney

Dec. 8, 1925.                    1,564,479
M. B. GROUT
WINDING MACHINE
Original Filed June 3, 1922    7 Sheets-Sheet 6
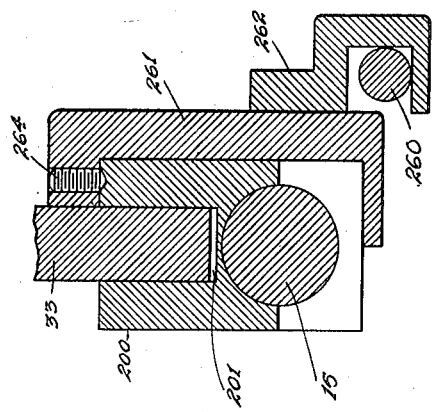
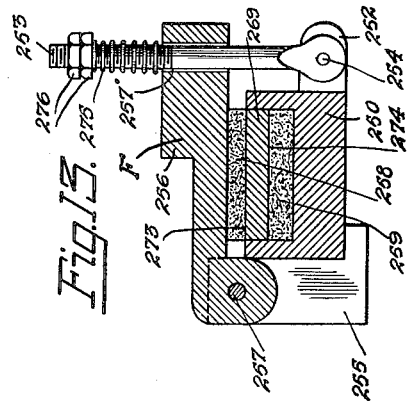
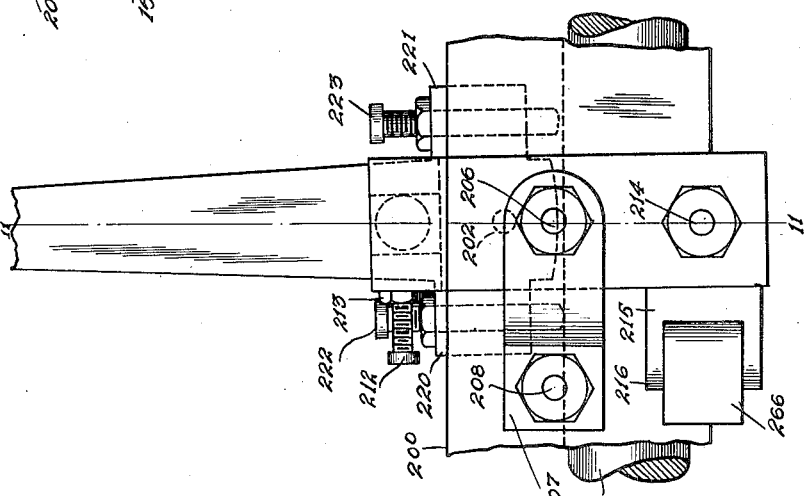
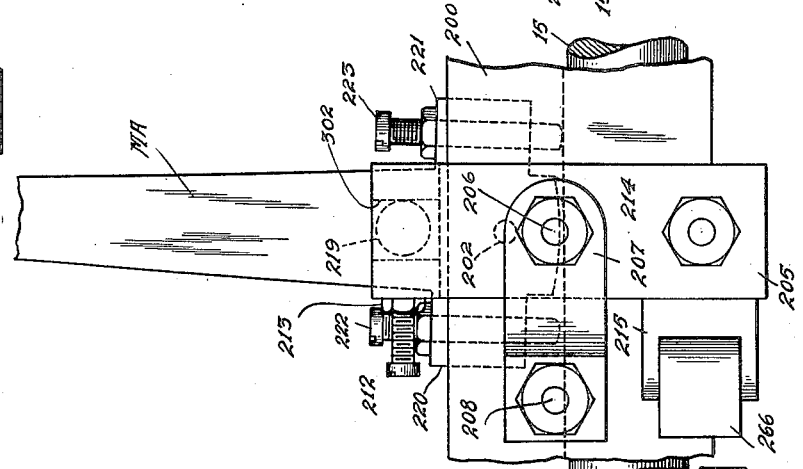

Dec. 8, 1925.
M. B. GROUT
1,564,479
WINDING MACHINE
Original Filed June 3, 1922 7 Sheets-Sheet 7
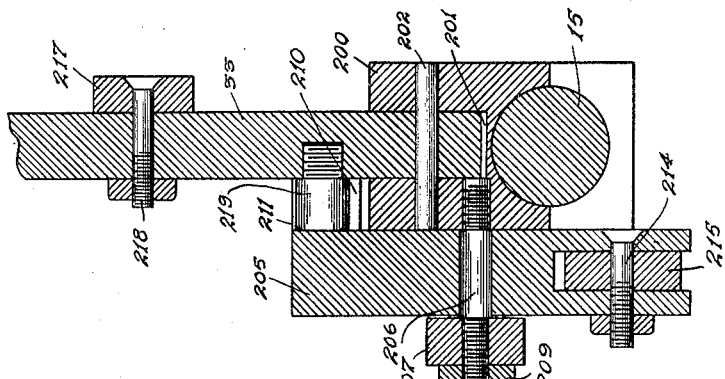
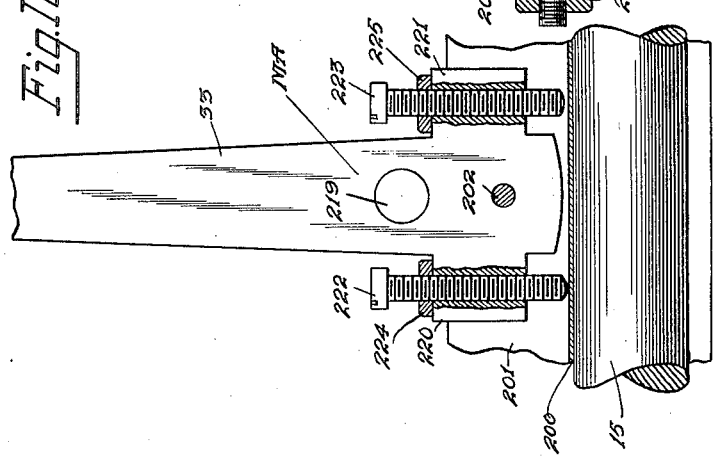
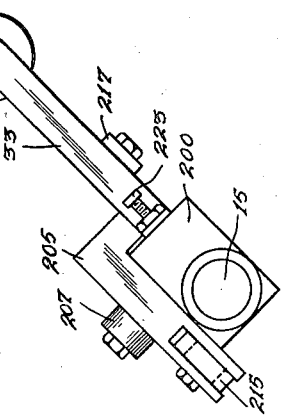
Inventor:
Martin B. Grout.
By Curtis & Camp,
Attorney.

Patented Dec. 8, 1925.

1,564,479

UNITED STATES PATENT OFFICE.

MARTIN B. GROUT, OF CHICAGO, ILLINOIS, ASSIGNOR TO KELLOGG SWITCHBOARD AND SUPPLY COMPANY, OF CHICAGO, ILLINOIS, A CORPORATION OF ILLINOIS.

WINDING MACHINE.

Application filed June 3, 1922, Serial No. 565,630. Renewed July 21, 1924.

*To all whom it may concern:*

Be it known that I, MARTIN B. GROUT, a citizen of the United States of America, and resident of Chicago, county of Cook, and State of Illinois, have invented certain new and useful Improvements in Winding Machines, of which the following is a specification.

My invention relates to coil winding machines and has to do more particularly with winding machines of the multiple type in which a plurality of electromagnet coils are wound simultaneously, and an object of my invention is to provide a machine of the above type by which this work can be done in a rapid, efficient and economical manner.

In machines of the present multiple type, a plurality of helices or coils may be wound simultaneously, and when a number of coils are wound simultaneously, a single tube common to all of them is used and the wire is wound upon it in separated zones or spaces and each sheet of insulating paper between each layer of convolutions of wire is common to all of the coils so as to mechanically connect all the coils together. When the coils have their predetermined number of convolutions, the common tube upon which the coils are simultaneously wound is removed and thereafter the plurality of coils may be separated into individual coils by sawing or cutting through the spaces between the zones of the coils.

The coils wound simultaneously by the multiple winding machine of the above type are built up of a plurality of layers of wire, each layer having a predetermined number of convolutions, while the convolutions of wire in one layer are insulated from those in the adjacent layer by means of several layers of interposed paper. The number of convolutions per layer to be placed upon the tube is gauged by means of suitable gearing mechanism. The travel of the wire from left to right, and vice versa, is controlled by means of suitable mechanism.

A sheet of paper common to all the coils is introduced between each successive layer of convolutions and is of such length as to place several layers of paper insulation between each layer of convolutions of wire. The winding machine of the above type, by means of suitable shifting mechanism, travels from left to right, and vice versa, to wind successive layers of wire on the core or tube, and by means of suitable mechanism or manual means a sheet of insulating paper is introduced between each layer of convolutions. This sheet of paper is injected into the coil at the instant one layer is finished and the next one begins and is grasped by the strands of wire and wound into the coil simultaneously with the first, second and third turns of winding in the new layer, depending on the number of layers of paper insulation which are to be inserted between each layer of wire of the coil.

One of the objectionable features of the winding machine of the above type is that after the first layer of paper insulation is wound into the coil simultaneously with the first turn of winding of the new layer and the second layer of paper is wound into the coil, a space equal to the thickness of the paper is placed between the first and second wire turns of the new layer. Should a third layer of paper be required, a space equal to the thickness of the paper is placed between the second and third wire turns of the new layer. It may readily be seen that in addition to the thickness of the three first wire turns of a new layer the thickness of the paper between the first and second turns and the second and third turns places the beginning of the fourth wire turn slightly in advance of the predetermined feed which has been set to wind a certain number of convolutions of wire per layer. This slight advance is brought about by the two thicknesses of paper between the first and second and second and third wire turns of a new layer. Now, as the machine operates, the feed arms which carry the wire across the coil are traveling at a predetermined rate, which rate of travel is regulated by means of suitable gearing, and as the beginning of the fourth turn is slightly in advance of the feed arms, it may be readily be seen that the next few turns will naturally pile up until the feed arms catch up. This piling up at the beginning of a new layer is very objectionable, as it produces a coil which is not uniform in diameter and there is more or less liability for short-circuited turns. In winding coils manually, the operator guides the wire by hand and the insertion of the paper at the beginning of a new layer and the first two or three wire turns of a new layer can be so spaced by the operator as to overcome this piling up of the first few turns. The multiple winding machines of the above type will not operate satisfactorily to prevent the above-mentioned piling up when the convolutions of wire are wound closely together, and it is one of the objects of my invention to provide means which overcomes this piling up of the first few wire turns of a new layer as described above.

To overcome and prevent the objectionable feature of the piling up of the turns of wire at the beginning of a new layer, I provide automatic means for automatically advancing or shifting the feed arms in the same direction in which the new layer is being wound upon the rotatable spindle shaft. The means for shifting the feed arms are adjustable and may be adjusted to shift the arms to any degree desired, and the spacing of the first few wire turns depends upon the adjustment of my compensating device. By means of my compensating device, the turns are not crowded ahead of the predetermined rate of travel of the carrier, because, say for example, that the carrier is set to place " X " number of turns of wire per inch to the layer, the instant a new layer is started and the first turn is complete, the feed arms are automatically shifted in the same direction in which the new layer is being put on, and for the next few turns the number of turns per inch is reduced the desired or predetermined amount to about " Y " turns per inch, and this spacing of the first few turns of each new layer is brought about by means of the shifting of the feed arms in the same direction in which the turns of wire of the layer are being wound on the coil. When the feed arms are shifted, the carrier feed carrying the feed arms will not move until the lost motion created by the shifting of the feed arms is overcome, which will be after the " Y " number of turns has been placed upon the coil, whereupon the shaft carrying the feed arms will move at the same rate of speed with the spindle shaft, and now places " X " number of turns per inch on the coils until the end of the coil is reached, when again the shifting mechanism is operated and the compensating means again operates to permit the first few turns of the new layer to be properly spaced by means of the shifting of the feed arms.

Another feature of my invention is the provision of novel means for accomplishing the operation of the compensating means and for overcoming the lost motion produced when the feed arms are moved to their shifted position.

For a more complete understanding of my invention, reference may be had to the accompanying drawings, in which like reference characters in the several views denote like parts. The entire coil winding machine is of considerable size and for the purpose of more clearly illustrating my invention, I have placed the controlling mechanism, which is the left-hand portion of the machine, on one sheet, and the feed devices, which is the right-hand portion of the machine, on a second sheet, while different views of the various parts of the machine are illustrated on other sheets. Thus, Fig. 1 is a plan view of the controlling mechanism of the machine, which is the left-hand portion of the machine;

Fig. 2 is a plan view of the feeding mechanism of the machine, which is the right-hand portion of the machine;

Fig. 3 is a right-side elevation of the machine;

Fig. 4 is a right-end view of the machine showing the friction device and levers for controlling the operation of the machine;

Fig. 5 is a view of the reversible gear mechanism;

Fig. 6 is a sectional view of the reversible gear mechanism;

Fig. 8 shows the master guide arm in its position the instant the reciprocating shaft starts its travel from left to right, and before it has been shifted to bring about the spacing of the first few turns of a new layer;

Fig. 9 is a view similar to Fig. 8, but showing the master arm in its position after it has completed its movement when traveling from right to left;

Fig. 10 is a view similar to Fig. 8 with parts broken away to clearly illustrate the construction of the master arm;

Fig. 11 is a sectional view along the line 11—11 of Fig. 9 to clearly illustrate the relation of the master arm with the carrying bar and its associated parts;

Fig. 12 is a left-side elevation of the shifting mechanism;

Fig. 13 is a sectional view along the line 13—13 of Fig. 7; and

Fig. 14 is a sectional view along the line 14—14 of Fig. 7.

Figure 1:
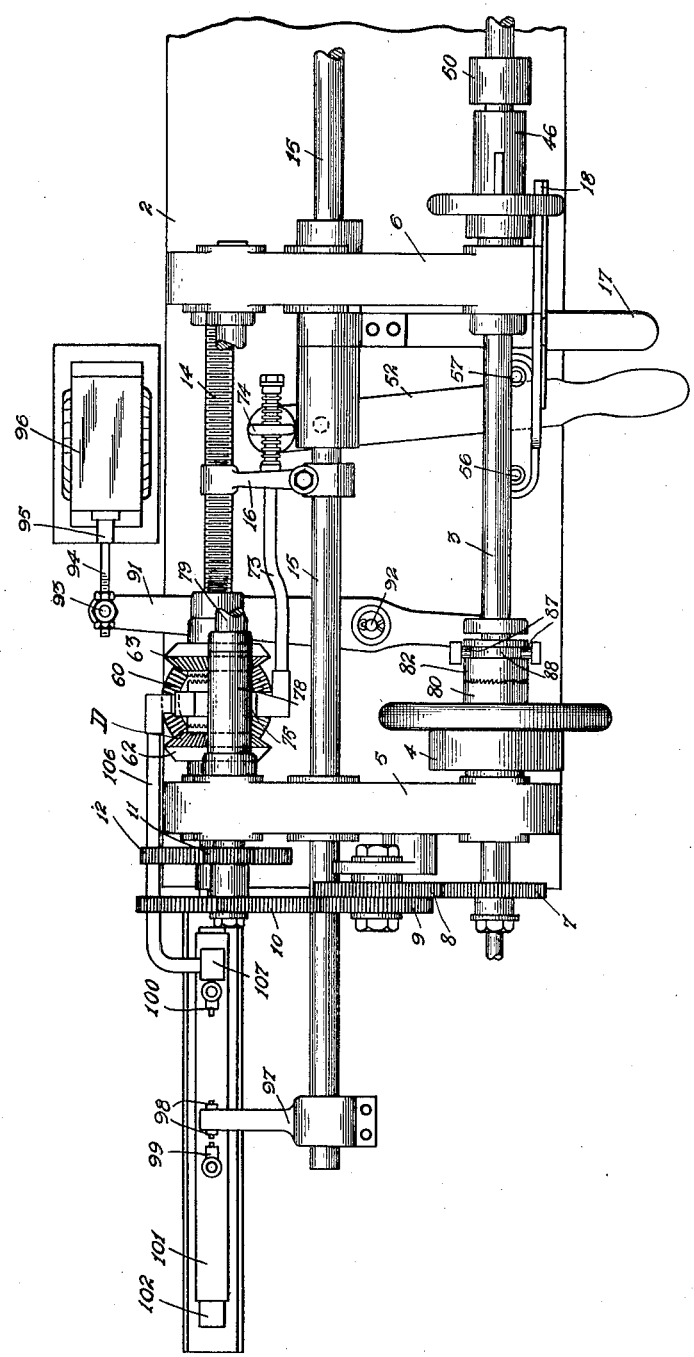
Figure 7:
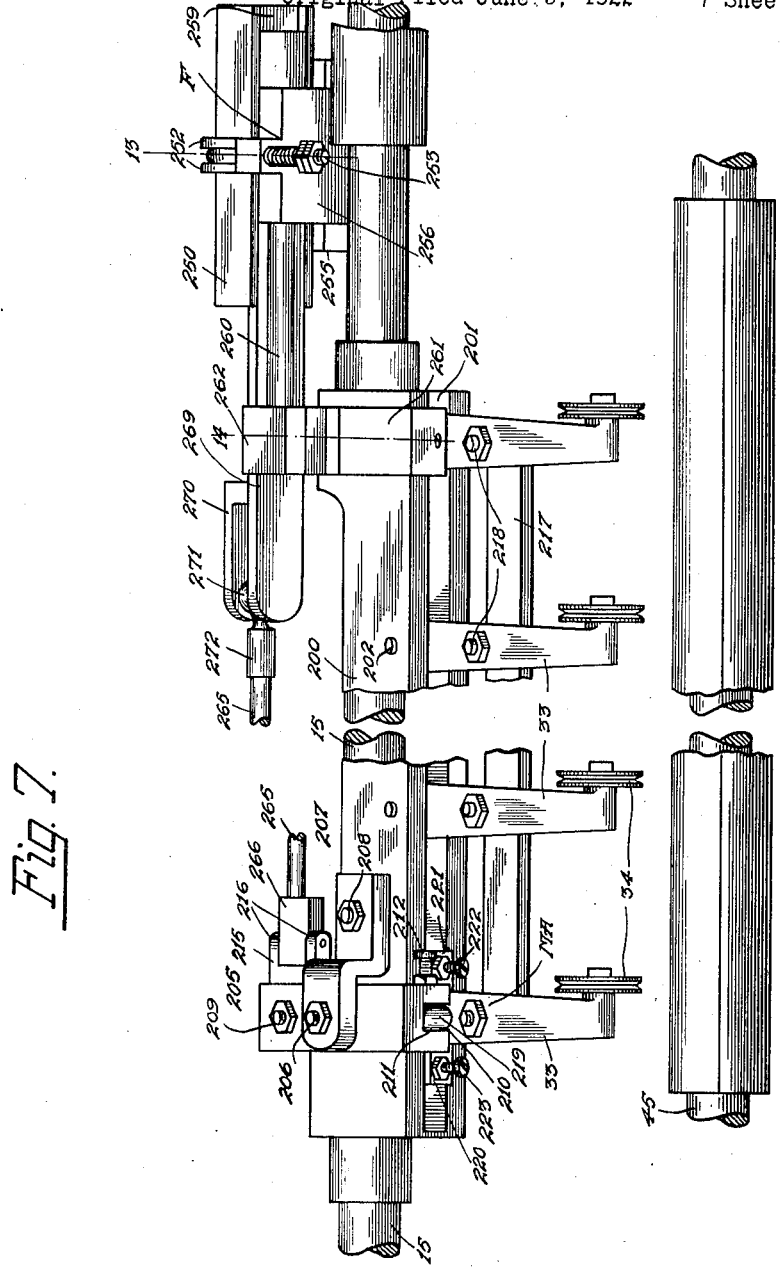
Fig. 7 is a plan view of the feed mechanism and of the compensating device.

Referring now more in detail to my invention as illustrated in the accompanying drawings, and first describing the main parts of the winding machine, it comprises a main frame or mounting plate 2, suitably supported upon a table or legs, not shown. The spindle shaft 3 has secured thereto a pulley wheel 4 which is connected to a power shaft by means of a suitable belt which is in turn connected to suitable tight and loose pulleys to transmit power to the pulley wheel 4 to rotate the spindle shaft 3. The power transmission mechanism is not shown, as it does not comprise a part of my invention, and any suitable power transmission may be used for transmitting power to the spindle shaft 3.

The spindle shaft 3 is supported at its one end by means of an end plate 5, which is secured to the base plate 2 in any suitable manner, and the opening through which the shaft 3 extends serves as a bearing for the same. The spindle shaft 3 is also supported intermediate of its end in an end plate 6 and the opening through which it extends serves as a bearing for the same. The winding shaft 3 has secured at its one end a gear wheel 7, and through the medium of a train of gear wheels 8, 9, 10, 11 and 12 rotary motion is transmitted to a screw shaft 14, and the ratio of the gear wheels 8, 9, 10, 11 and 12 to each other determines the number of convolutions per inch which are placed in each layer of wire of the coils that are to be wound. The screw shaft 14 is threaded and is suitably journaled in the end plates 5 and 6, and associated with the shaft 14 is a gearing device D for purposes as will presently be described. A reciprocating shaft 15 is provided, which is journaled at its one end in the end plate 5, and at an intermediate point in the end plate 6. An arm 16 is suitably secured to the shaft 15 and is provided with a threaded face which is adapted to mesh with the screw of the screw shaft 14. The shaft 15 has secured thereto a control lever 17 and has associated therewith a guide plate 18 suitably secured to the base plate 2, and the movement of the lever 17 rocks the reciprocating shaft 15 to either place the threaded face of the arm 16 in mesh with the threaded shaft 14 or rock the arm 16 so that its threaded face is out of engagement with the screw shaft 14, for purposes as will presently be described.

Referring now to Figs. 2 and 3, in Fig. 2 I illustrate the right-hand portion of the winding machine, which comprises the supply device SD supported upon a suitable base 20 upon which are secured the wire reel base or spool racks or brackets RB, of which I show eight, which indicates that the machine is adapted to wind eight coils simultaneously, and as each one is similar in construction, it is thought that the description of one will suffice. The spool holder RB comprises a bracket 21 to which is secured a rod 22 extending forward of the bracket 21, and secured to its free end I show a combination latch and spindle support 23. The spindle 24, which supports the spool of wire 25, has its one end journaled in the bracket 21 and its other end centered in the head 26 of the support 23, when the support is in position. The spindle support 23 is held in position by means of a latch 27, which, when operated, permits the support to be swung downward about its pivot 28 to permit the removal of an empty spool of wire and to permit the placing of a full spool of wire. An arm 30 is pivotally supported on the bracket 21, and secured to its free end I show a grooved guide wheel 31.

The reciprocating shaft 15 extends through the end plate 6 and lies forward of the reel or spool brackets RB, and its end is journaled in the bearing 32, which is in turn secured to the base 2. I show the reciprocating rod 15 equipped with eight guiding arms 33, each of which has rotatably secured thereto a grooved guide wheel 34, which indicates that the machine is adapted to wind eight coils simultaneously. Wings 35, one on each side of the bracket 21 and integrally formed therewith, have secured thereto guide wires 36, and slidably mounted on the said wires is a block 37 carrying a rotatable guide wheel 38. The arm 30 is normally under tension through the agency of a coil spring 39, which has one end secured to an adjustable pin 40, which rests in a suitable orifice in the rod 22. The other end of the spring 39 is secured to one arm 41 of the bell crank lever 42 and the other arm 43 of the lever 42 has secured thereto a rod 44 whose other end is secured to the arm 30. The arm 43 supports a suitable friction pad 300, which pad 300 engages a disk 301 associated with the spindle 24, and the spring 39 in association with the arm 43 of the lever 42 causes the pad 300 to engage disk 301 and prevents the spool 25 from rotating too fast when the machine is running, thus keeping the wire under a constant tension when being unwound while the machine is in use.

The spindle shaft 3, which protrudes through its bearing in the end plate 6, has secured thereto a winding spindle 45 by means of a hinge joint 46, the other end of the spindle 45 being supported by means of a suitable block 47, which is secured to the base 2. The block 47 has a clamping member 48 which, when turned, permits the withdrawal of the center 49 so that the winding spindle 45 can be swung forward through the agency of the hinge 46 so that a tube may be slipped over the winding spindle 45 and forced into the chuck 50 and clamped therein by means of a suitable set screw. Next, the strands of wire 51 are led from the spools 25, which are located at the rear of the winding spindle 45, over the grooved wheel 38, thence under the guide wheel 31 on the arm 30, and thence under the guide wheels 34 on the arms 33, which arms 33 are secured to the reciprocating shaft 15, and finally to the tube on the winding spindle 45, and attached to suitable terminals in any suitable manner. The block 37 has secured to it a coil spring 251 of a very light tension, the other end of said spring 251 being suitably secured to a suitable part of the machine, and under normal running conditions of the machine the pull of the wire strands 51 is such as to hold the block 37 against an adjustable stop 253 slidably secured to one of the guide wires 36. Now, if for any reason the strands 51 become slack, the spring 251 will take up this slack and will at all times hold the strands 51 taut.

Having described in general the essential parts of the multiple winding machine with which my invention is adapted to operate, I will now describe in detail the operation of the control mechanism for causing the operation of the winding machine. I show a lever 52 pivoted intermediate of its ends by means of the pivot bearing 53 secured to the base 2. The lever 52 is provided with a handle which extends forward of the machine proper, so it may be grasped by the operator. The lever 52 rests between two plates 54 and 55, and tension screws 56 and 57 are provided to exert downward pressure upon the upper plate 54 so as to produce frictional engagement between the faces of the plates 54 and 55, and the faces of the lever 52 so as to hold the lever in either of its positions. A stud 58 is provided on either side of the lever 52 and between the plates 54 and 55 near their ends, which serve as separators between the plates 54 and 55 and also serve as stops for the lever 52 to limit the movement in its right or left direction. The lever 52 and its associated mechanism control the movement of the reciprocating shaft 15 to the right or left through the agency of a reversible gearing mechanism D and its associated screw shaft 14. The gearing arrangement D comprises a bevel gear 60 rotatably supported upon a suitable bearing 61 which is secured to the base plate 2 and which meshes with a pair of bevel gears 62 and 63 operatively associated with the screw shaft 14. A shaft 64 is provided which is suitably journaled in the end plate 5 to permit its rotation, and keyed to it is the gear wheel 12, which through its association with the gear train 8, 9, 10, etc., transmits motion to the screw shaft 14. The bevel gear 62 is keyed to the shaft 14 in any suitable manner and thus rotates with it, and being in mesh with the bevel gear 61, motion is transmitted to the said gear 61, and the said bevel gear 61 in turn transmitting motion to the bevel gear 63. The screw shaft 14 has a reduced end portion 65 of a size to fit in the orifice 66 in the end of the shaft 64, which serves as one bearing for the shaft 14, the other end being journaled in the end plate 6. The bevel gear 63 is loosely secured to the shaft 14 and suitably collared to prevent lateral movement of the same on the shaft 14. A sleeve 67 is provided which is slidably mounted upon the shaft 14 between the bevel gears 62 and 63 by means of a suitable keyway 68. The plane faces 69 and 70 of the sleeve 67 are toothed, as are the plane faces 71 and 72 of the bevel gears 62 and 63, so that when the sleeve 67 is moved to the left its toothed face 69 meshes with the toothed face 71 of the bevel gear 62, and when moved to the right its toothed face 70 meshes with the toothed face 72 of the bevel gear 63, and the meshing of these toothed faces determines the direction of travel of the reciprocating shaft 15, as will presently be described.

As illustrated, I show a connecting means between the lever 52 and the slidable sleeve 67 in the form of a rod 73, which has its one end secured to the head 74 secured to the lever 52, and its other end secured to a yoke 75, which spans the sleeve 67. The legs of the yoke 75 are provided with pins 76 which rest in the annular groove 77 in the sleeve 67 to permit the said sleeve 67 to be shifted to the right or left. The yoke 75 is pivotally supported by means of a collar 78 which is secured to the shaft 79. As illustrated in Fig. 1, I show the lever 52 moved to the right, and through the agency of the rod 73 this movement is transmitted to the yoke 75, which is in turn rocked about its pivot to shift the sleeve 67 to the left to cause the toothed face 69 of the sleeve 67 to engage the toothed face 71 of the bevel gear 62. Motion is now transmitted to the sleeve 67 and as the sleeve 67 is slidably keyed to the screw shaft 14, the said screw shaft 14 is rotated and as the arm 16, which is secured to the reciprocating shaft 15, has its screw face in engagement with the thread of the screw shaft 14, the reciprocating shaft 15 is now carried to the right. By means of the gearing train and their pitch ratio to each other, the ratio of the number of revolutions of the screw shaft 14 to that of the spindle shaft 3 determines the number of convolutions of wire per inch that are to be placed in each layer of the coil.

I also provide a clutch mechanism C which is electrically controlled whereby when the last convolution of wire is put on a layer the clutch mechanism is operated to disengage the power device from the spindle shaft and stop further operation of the machine and permit the operator to actuate the lever 52 and automatically release the clutch to permit the power drive to again be placed in driving relation with the spindle shaft 3 so that the machine may start again and cause the reciprocating shaft 15 to move in a reverse direction. The pulley 4 is loose upon the spindle shaft 3 and is provided with an extension 80 whose plane face 81 is toothed. A slidable collar 82 is keyed to the spindle shaft 3 and its left plane face 83 is toothed so that when in mesh with the toothed face of the pulley extension 80, power may be transmitted to the spindle shaft 3. A yoke 85 pivotally supported intermediate of its ends by means of a suitable bracket 86 cooperates with the collar 82 to move it into engagement with the power-driven pulley or out of engagement with the power-driven pulley 4. The legs of the yoke 85 which span the collar 82 are provided with pins 87 which rest in an annular groove 88 in the collar 82. The arm extension 89 of the yoke 85 has a reduced portion 90 which rests in the bifurcated end of the connecting rod 91, which is pivoted intermediate of its ends by means of a pivot pin 92 which is suitably secured to the base 2. The opposite end of the rod 91 is provided with a post 93 which is provided with an orifice of a size to receive a threaded stud 94 which is suitably secured to the core 95 of the solenoid 96. The reciprocating shaft 15 has secured to its left extremity an arm 97 which carries a contact 98 which is operatively associated with a pair of contacts 99 and 100. The contacts 99 and 100 are mounted on a plate 101 which is slidably secured to a base 102, which base is in turn secured to the base 2. The plate 101 upon which the contacts 99 and 100 are secured is slidably supported and may be moved to the right or left a short distance for purposes as will now be described. Assuming that the reciprocating shaft 15 is traveling from right to left, at the instant that the last turn of wire is placed on the layer that the machine is winding in a right to left direction, the contact 98 of the arm 97 engages the contact 99 on the slidable plate 101. This closure of contacts 98 and 99 establishes an energizing circuit for the solenoid 96 to attract its core 95, and due to the connection between the core 95 and the rod 91, the said rod 91 is moved about its pivot 92 to cause the end which engages the arm 89 of the yoke 85 to rotate the said yoke 95 about its pivot 105, and due to the connection between the collar 82 and the yoke 85, the said collar 82 is moved to the right to disengage the power-driven pulley 4, thus stopping further winding of the machine as the pulley 4 is loose on the shaft 3. The operator now grasps the lever 52 and moves it to the right to place it in the position shown in Fig. 1. This movement of the lever 52 moves the rod 73 to the right and rotates the yoke 75 about its pivot to move the sleeve 67 to the left, causing the toothed face 70 of the sleeve 67 to disengage the toothed face 72 of the bevel gear 63 and cause the toothed face 69 of the sleeve 67 to engage the toothed face 71 of the bevel gear 62. A rod 106 is provided which has its one end secured to the yoke 75 and its other end secured to a block 107 which is mounted on the sliding plate 101. Thus, when the yoke 75 is rotated about its pivot 79 when the lever 52 is actuated, the movement of the yoke 75 moves the rod 106 to the left, and as the rod 106 is connected to the plate 101, the said plate is also moved to the left, opening the contacts 98 and 99. This opening of contacts 98 and 99 opens the energizing circuit of the solenoid 96, and it releases its core 95, allowing the arm 91 to again rotate about its pivot 92 and again permit the toothed face 83 of the sleeve 82 to again engage the toothed face 81 of the extension 80 of the power-driven pulley 4, and this is the position of the mechanism as illustrated in Fig. 1 and places the machine in condition to place a layer on the coils from left to right. To start the machine the operator actuates a suitable starting pedal and as the clutch is thrown in a position the shaft 3 is again connected to the power-driven pulley 4 and motion is transmitted to the screw-shaft 3 in a direction to cause the reciprocating shaft 15 to travel from left to right to place another layer of wire in the core.

The description up to this point gives in detail the shifting mechanism for reversing the travel of the mechanism to place successive layers of wire on the coil. I will now describe in detail the arrangement of the compensating mechanism of my invention for preventing the piling up of the first few turns of wire at the beginning of a new layer being wound upon the coil.

For associating the guide arms 33 with the reciprocating shaft 15 so that the same may travel with the said shaft 15, I provide a supporting member or rack 200, which is provided with a channel 201 to receive the guide arms 33. The arms 33 are properly spaced from each other and pivotally mounted in said channel 201 by means of pivot pins 202, which extend through suitable orifices in the arms 33 and which are secured in orifices provided in the sides of the rack 201 by a drive fit. The member 200 is securely clamped upon the shaft 15 in any suitable manner to prevent movement of the same on the said shaft. To the left end portion of the member 200 is secured the compensating means of my invention for shifting the guide arms 33 and which comprises an L-shaped member 205 which is pivotally supported on the member 200 by a pivot pin 206 whose one threaded end has screw-threaded engagement with a suitable tapped orifice in the member 200, and which pin has its other end threaded for receiving a nut. To prevent the displacement of the L-shaped member 205, a Z-shaped member 207 is provided which is secured to the member 200 by a screw 208 which passes through a suitable orifice in the member 207 and has screw-threaded engagement with an orifice in the member 200; the other end of the member 207 has an orifice for receiving the threaded end of the pivot pin 206, and to maintain the member 207 in this position a nut 209 is provided to engage the threaded end portion of the pivot pin 206. A slot 210 is provided in the leg 211 of the member 205, and an adjustable set screw 212 is provided which engages a suitable tapped orifice in the leg 211, which permits one end of an adjustable screw stop 212 to protrude into the slot 210 and cooperate with a pin 219 secured to the arm MR to limit the pivotal movement of the member 205 for purposes as will be presently described. A lock nut 213 is provided for maintaining the said screw 212 in its adjusted position. The other leg of the L-shaped member 205 has its free end bifurcated and is of a size to receive a member 215 provided with projections 216 integrally formed with its one end and having its other end pivotally supported in the bifurcated end of the member 205 by means of the bolt 214. The first guide arm 33 to the left will be termed the master arm MA, since through its movement the movement of the other guide arms 33 is controlled, due to the fact that all of the arms 33 are cooperatively connected together and to the master arm MA by a master bar 217 which is pivotally secured to the arms 33 by the pivot pins 218 which engage suitable orifices in the guide arms 33 and master bar 217. The master arm MA is pivotally mounted in the channel 201 of the member 200 by the pivot pin 202, as before described, and said arm MA is provided with a pin 219, which is secured thereto by means of its threaded end, which has screw-threaded engagement with an orifice in the arm MA, said pin 219 being arranged so that it rests the slot 210 in the member 205, and cooperates with the adjustable screw stop 212, the purpose of which will hereinafter be pointed out. The arm MA is provided with a pair of integrally formed wings 220 and 221, each of which is provided with a threaded orifice, which are adapted to receive the adjustable stop screws 222 and 223. Lock nuts 224 and 225 are provided for the stop screws 222 and 223 for the usual well-known purposes. The adjustable set screws 222 and 223 regulate the extent of the pivotal movement of the arm MA to the right or left for purposes as will be presently described.

To the right end portion of the rack 200 I associate a frictional device F which comprises a U-shaped member 250 which is secured to a supporting block 251 secured to the base 2 by any suitable means. The U-shaped member 250 has integrally formed ears 252 intermediate of its ends, between which a rod 253 is pivotally supported by means of a pin 254 engaging orifices in said ears 252 and rod 253. To the back of the member 250 is secured a pair of plates 255 by means of screws engaging suitable orifices in said plates 255 and member 250. Between the plates 255 a member 256 is pivotally mounted at its one end by means of a pivot pin 257 and in the other end an orifice 257' is provided through which the rod 253 passes. To the bottom surface of the member 256 is secured by means of rivets or screws a frictional member 258, which may be of leather, or any substance which will give a frictional effect, and to the U-shaped member 250 is also secured a similar frictional member 259 by means of suitable rivets or screws. A flat sliding plate 269 is slidably supported between the friction plates 258 and 259 and has secured to its one end an angular strip 270. The inner surfaces of the strip 270 and plate 269 are slightly hollowed out to receive a ball 271, to provide a ball and socket joint, the said ball 271 having a connecting knuckle 272 secured thereto. The plate 269 rests between the legs of the U-shaped member 250 and also operatively engages the faces 273 and 274 of the frictional members 258 and 259. In order to obtain a definite frictional engagement between the plate 269 and members 258 and 259, a coil spring 275 is provided which is placed over the free end of the rod 253 and has its one end bearing against the upper face of the member 256 and its other end bearing against the bottom face of a nut 276 which has screw-threaded engagement with the rod 253. By this arrangement the nut 276 may be moved downward to increase the tension of the spring 275, thereby forcing the members 258 and 259 and plate 269 into closer engagement with each other. A cylindrical rod 260 is secured in an orifice of the member 256 by means of a drive fit, said rod extending parallel to the guide arm carrying member 200. A U-shaped plate 261 having a hook-shaped member 262 secured thereto by suitable means is clamped to the arm carrying member 200 by means of the set screw 264, which engages an orifice in the said plate 261. The hooked portion of the member 262 is adapted to receive the rod 260, the purpose of which will presently be described. The L-shaped member 205 and the frictional means F are now operatively connected together by means of a connecting rod 265, which has its one end connected to block 266, which is pivotally mounted between the ears 216 of the member 215 by means of a pin 267 extending through suitable orifices in said ears 216 and said connecting block 266; the other end of said rod 265 being connected to the connecting knuckle 272 by a threaded engagement.

Having described the apparatus which comprises my compensating device, I will now describe in detail its operation in connection with the winding of a coil. When the lever 52 has been moved to the position shown in Fig. 1, which is the position of the lever 52 when the reciprocating shaft 15 starts travel from left to right, and the clutch pedal is operated, the shaft 15 will be moved from left to right by the power mechanism. Assuming, for the sake of a clear explanation of the operation of the machine, that the ratio of the train of gearing of the machine is arranged to wind a layer of wire at the rate of 169 turns of wire per inch on the coil and that three turns of insulating paper are to be placed between each new layer of wire. Now, the instant that the operator operates the clutch pedal to apply power to the power drive pulley 4, motion is transmitted to the screw shaft 14 through the train of gearing and the gearing mechanism D, and as the arm 16 of the reciprocating shaft 15 is in engagement with the screw shaft 14, the shaft starts travel to the right. The instant the power is applied to the drive pulley 4 the shaft 3 begins to rotate to place the turns of wire upon the coil and to wind the paper into the coil. Due to the adjustment of the compensating device, the first turn or turn and a half of wire may be put on at the rate of 169 turns per inch, and the next few turns may be put in, say, at the rate of fifty turns per inch, due to the adjustment of the compensating device. When the shaft 3 begins to rotate and at the same time the shaft 15, to which the arm carrying member 200 is secured, and which travels with said shaft 15, begins to travel to the right, the number of turns of wire will be put on at the rate of 169 turns per inch and at the same time the member 205 of the compensating device will be rotated about its pivot 206 to the right, due to the pressure exerted upon it by the movement of the shaft 15 to the right, and also due to the friction device F which grips the plate 269 between the friction members 258 and 259, the friction device being of sufficient strength at this time to prevent the lateral movement of the plate 269, to which is connected one end of the member 205 through the medium of the connecting rod 265. Just as soon as the member 205 has rotated about its pivot far enough so that the left side of the slot 210 engages the pin 219 of the master arm MA, which we have assumed will be immediately after the completion of the first turn or turn and a half of wire and paper upon the coil, the master arm MA will rotate about its pivot 202 to the right to space the next few turns of wire at the rate of fifty turns per inch until the stop screw 223 engages the bottom of the channel 201 in the member 200, which will prevent the further rotation of the master arm MA and member 205 to the right, whereupon the pressure exerted upon the plate 269 by the friction device is overcome by the lateral pressure exerted upon the shaft 15, whereby the said plate 269 slides to the right between the friction member 258 and 259 of the friction device, and the turns of wire are again put on at the rate of 169 turns per inch.

It will be understood that the turns of wire of the coils associated with the other guide arms 33 will be wound in the same manner and at the same rate of turns of wire per inch as that described above since the guide arms 33 are connected to the master arm MA by the connecting bar 217 and the said arms 33 move simultaneously in the same direction in which the master arm MA moves.

Now, when the shaft 15 carrying the guide arms MA and 33 and the compensating device has moved to the right its entire distance, a new sheet of paper is placed ready to be wound into the coil. The operator, after placing the edge of the paper upon the coil and beneath the strands of wire 51, moves the lever 52 to the left and then operates the clutch pedal to apply power to the power drive pulley 4 for the same purpose just described above. The shaft 15 will now travel from right to left and the member 205 will rotate about its pivot 206 due to the pressure exerted upon it by the shaft 15, and due to the non-movement of the plate 269 through the friction device F, which at this time is of sufficient strength to prevent the sliding of said plate 269 between the friction plates 258 and 259. When the member 205 has rotated to the left far enough so that the right side of the slot 210 engages the pin 219 on the master arm MA, and up until the side of said slot 210 does engage said pin 219, the turns of wire will be put on at the rate of 169 turns per inch, which will be only during the first or first and a half turn as before described, the master arm MA will be rotated about its pivot 202 to the left until the top screw 222 engages the bottom of the channel 201 of the member 200, and during this rotation of the arm MA the turns of wire will be wound at the rate of fifty turns per inch. When the stop screw 222 engages the bottom of the channel 201 the master arm is prevented from further rotation to the left and the turns of wire will again be wound at the rate of 169 turns per inch, and the pressure now exerted upon the member 205 by the shaft 15 overcomes the grip of the friction device, whereby the plate 269 slides between the friction plates 258 and 259 to the left with the shaft 15. When the shaft has traveled to the left its entire distance, the operator inserts another sheet of paper and operates the lever 52 and clutch pedal to start the travel of the shaft 15 to the right, as described above.

Should the operator desire to space the tunrs of wire manually, as for instance at the beginning of a new coil or upon the completion of a coil, she may do so by operating the lever 17 connected to the shaft 15, which will cause the shaft 15 to rock in its bearing to cause the disengagement of the arm 16 and threaded shaft 14 and to release the pressure exerted upon the plate 269 by the friction device F. When the lever 17 is operated the shaft 15 is rocked downward, causing the hook member 262 to engage the rod 260 connected to the plate 256 to cause said plate 256 to raise upward against the tension of the said spring 275, whereby the plate 269 is released and free to move, thus permitting the shaft 15 to be freely moved to the right or left.

It may thus be seen that the instant that the spindle shaft 45 rotates, the shaft 15 also starts moving from left to right. The member 200 is secured to the shaft 15 and as it also carries the pivotally supported arms 33, the said arms also travel from left to right. The member 205 is pivotally supported upon the member 200 and the instant the shaft 15 starts its travel the member 200 moves with it. The member 205 is operatively associated with the plate 269 through the medium of the connecting rod 265, and due to the friction means F through which the plate 269 extends, lateral movement of the plate 269 is prevented. The movement of the member 200 continues, and this friction, which prevents the movement of plate 269, causes the member 205 to rotate about its pivot through the agency of the connecting link 265, until the face 302 of the slot 211 engages the stud 219 on the arm. During the movement of the member 205 the arm does not rotate about its pivot and the first turn of wire is placed on the new layer at a predetermined rate. The continued movement of the member 200 causes further rotation of the member 205 about its pivot 206, but as the face 302 of the slot 211 now engages the stud 219, the master arm MA is rocked about its pivot and moved to the right. The movement of the member 205 is slight, but due to the fact that the arm MA is pivoted at the point 202 and movement is transmitted thereto through the agency of the member 205 and stud 219, this slight movement of member 205 is multiplied due to the difference of the pivot centers of the member 205 and arm MA, and this movement of the arm MA is multiplied at its free end and causes the next few turns to be spaced apart, and when the screw stop 222 engages the bottom of channel 201, further movement of member 205 and arm MA is prevented and the turns are again placed on at a predetermined rate. This shifting of arm MA is also transmitted to the seven other arms 33, due to the connecting link 217.

By having the member 205 and master arm MA pivoted at different centers and associated by means of the slot 210 and pin 219, I am able to advance or shift the guide arms of the feeding device to the left or right, depending on the direction of the travel of the shaft 15 so that the turns of wire may be properly spaced and so that the feeding device will not lag behind the first few turns of wire due to the convolutions of paper being wound into the coil between said turns of wire, thus avoiding any crossing or piling up of turns of wire. Furthermore, by the adjustment of the set screw 212 in the slot 210, I am able to decrease or increase the predetermined number of turns of wire per inch at the beginning of each new layer before the guide arms are shifted, and by means of the adjustable stop screws 222 and 223 I am able to increase or decrease the amount of movement of the guide arms, which will determine the number of turns of wire per inch during the shifting of said guide arms.

While I have described my invention in connection with a particular type of multiple winding machine, I do not wish to limit the application of my invention to a particular type of winding machine, as my invention is applicable to other types of winding machines. Furthermore, it is to be understood that my device is adjustable to put on different numbers of turns of wire per inch and is not to be limited to 169 or 50 turns per inch, as these numbers were used only for the purpose of explanation. I also do not wish to be limited to the exact structure as shown, as changes and modifications will readily suggest themselves and I, therefore, aim to cover all such changes and modifications as come within the spirit and scope of the appended claims.

What I claim as new and desire to secure by United States Letters Patent, is:

1. A machine of the class described comprising a winding spindle, reciprocating means for feeding strands of wire thereon in layers to form a coil, and means including frictional means for shifting said reciprocating means in the same direction in which the layers are being wound on the coil during the feeding operation of said reciprocating means.

2. A machine of the class described comprising a winding spindle, feeding means for feeding strands of wire thereon in layers to form a coil, and means including frictional means for automatically shifting said feeding means in the same direction in which the layers of wire are being wound on the coil.

3. A machine of the class described comprising a winding spindle, a plurality of feeding members for feeding strands of wire on said spindle in layers to form a coil, a shaft for carrying said members, and means for shifting said members in advance of the travel of said shaft and in the same direction of travel.

4. A machine of the class described including a winding spindle, power mechanism for rotating said winding spindle, reciprocating means having means secured thereto for feeding strands of wire to said winding spindle, and means for shifting said last means in advance of and in the same direction of travel of said reciprocating means.

5. A machine of the class described comprising a reciprocating shaft, power mechanism for driving said reciprocating shaft, a plurality of pivotally supported members secured to said shaft, and means associated with said shaft for moving said members about their pivots when said shaft is driven by said power mechanism.

6. A machine of the character described comprising a winding spindle, a reciprocating shaft, power and gear mechanism for driving said winding spindle and reciprocating shaft, feeding means including a plurality of guiding members mounted on said reciprocating shaft for directing strands of wire to said winding spindle, and means associated with said guiding members for shifting said members in advance of and in the same direction of travel of said reciprocating shaft.

7. A machine of the character described including a winding spindle, a reciprocating shaft, power and gearing mechanism for driving said spindle and said shaft, means for controlling the direction of travel of said reciprocating shaft, a plurality of guiding members pivotally mounted on said reciprocating shaft, and means for shifting said guiding members in advance of the travel of said reciprocating shaft.

8. A machine of the class described including a reciprocating shaft, power and gearing mechanism for driving said shaft, a plurality of pivotally supported members secured to said shaft, means associated with said members for moving said members about their pivots, and adjustable means for controlling the amount of movement of said members.

9. A machine of the class described including a reciprocating shaft, power and gearing mechanism for driving the same, a plurality of pivotally supported members secured to said shaft, and shifting means associated with said members and adapted to move said members about their pivots when opposed forces are exerted upon said shifting means.

10. A machine of the class described including a reciprocating shaft, power and gearing mechanism for driving the same, a plurality of pivotally supported members secured to said shaft, shifting means associated with said members and adapted to move said members about their pivots when opposed forces are exerted upon said shifting means, and adjustable means for regulating the amount of movement of said members.

11. A machine of the character described including a winding spindle, a reciprocating shaft, a plurality of strands of wire, guiding mechanism pivotally mounted on said reciprocating shaft for guiding said strands of wire to said winding spindle, means for causing said winding spindle to rotate to wind said strands of wire into layers to form coils, means associated with said reciprocating shaft and guiding mechanism for advancing said guiding mechanism relative to said reciprocating shaft at the beginning of each layer of wire.

12. A machine of the class described including a winding spindle, a reciprocating shaft, guiding means pivotally supported on said reciprocating shaft for guiding and feeding strands of wire to said winding spindle, and means for giving motion to said winding spindle and said reciprocating shaft to cause said strands of wire to be wound into layers on said winding spindle to form coils.

13. A machine of the character described including a winding spindle, a reciprocating shaft, an arm pivotally supported on said reciprocating shaft for guiding a strand of wire to said winding spindle, means associated with said reciprocating shaft and winding spindle for effecting motion of said reciprocating shaft and winding spindle whereby said strand of wire is wound into layers to form a coil, and means for rotating said arm about its pivot during the winding of said strand of wire to prevent convolutions of each layer of wire from being wound one upon the other.

14. A machine of the character described including a winding spindle, a reciprocating shaft, feeding mechanism for feeding strands of wire to said winding spindle, a plurality of guiding members pivotally supported on said reciprocating shaft for guiding said strands of wire to said winding spindle, means for effecting motion of said reciprocating shaft and said winding spindle to cause said strands of wire to be wound into layers to form coils, and means associated with one of said guiding members for advancing said guiding members relative to said reciprocating shaft to prevent the piling up of convolutions of said strands during the winding of each layer of wire.

15. A machine of the character described including a winding spindle, a reciprocating shaft, feeding mechanism including strands of wire extending to said winding spindle, a plurality of guiding members pivotally supported on said reciprocating shaft and adapted to guide said strands of wire to said winding spindle, means for operatively connecting said guiding members, means for effecting movement of said reciprocating shaft and winding spindle, to cause said strands of wire to be wound into layers to form coils, and means associated with one of said guiding members for causing said guiding members to be moved in advance of said reciprocating shaft in the same direction in which each layer of wire is being wound.

16. A machine of the character described including a winding spindle, a reciprocating shaft, feeding mechanism including a strand of wire extending to said winding spindle, a guiding member pivotally mounted on said reciprocating shaft for guiding said strand to said winding spindle, means for effecting movement of said winding spindle and reciprocating shaft to wind said strand of wire into layers to form a coil, frictional means associated with said guiding member for effecting pivotal movement of said guiding member in an advanced direction relative to the movement of said reciprocating shaft.

17. A machine of the class described, including a winding spindle, feeding mechanism for feeding a flexible member which is adapted to be wound on said winding spindle, a two way longitudinally movable member, means for effecting movement of said winding spindle and said movable member, guiding means pivotally supported on said movable member for guiding said flexible member to said winding spindle.

18. A machine of the class described including a winding spindle, a reciprocating shaft, feeding mechanism for feeding a flexible member which is adapted to be wound around said winding spindle, and pivotally supported guiding means secured to said reciprocating shaft for guiding said flexible member relative to said winding spindle.

19. A machine of the class described comprising a rotatable shaft, a longitudinally movable shaft, feeding mechanism for feeding a supply of flexible material which is adapted to be coiled around said rotatable shaft, and pivotally supported means secured to said longitudinally movable shaft for guiding said flexible material relative to said rotatable shaft.

20. A machine of the class described including a rotatable shaft, a longitudinally movable shaft, feeding mechanism for feeding a supply of flexible material which is adapted to be wound around said rotatable shaft, guiding means supported on said longitudinally movable shaft for guiding said flexible material relative to said rotatable shaft, and means for moving said guiding means relative to said shafts.

21. A machine of the class described, including a rotatable winding spindle, a longitudinally movable shaft, feeding mechanism for feeding a supply of flexible material which is adapted to be wound into layers on said winding spindle to form a coil, guiding means, for guiding said flexible material to said winding spindle, pivotally supported on said movable shaft, and means for effecting pivotal movement of said guiding means.

22. A machine of the class described including a winding spindle, a reciprocating shaft, feeding mechanism for feeding a supply of flexible material which is adapted to be wound into a coil by said winding spindle, guiding means for guiding said flexible material relative to said winding spindle, means secured to said reciprocating shaft for pivotally supporting said guiding means, means for effecting pivotal movement of said guiding means, and adjustable means for increasing or decreasing the pivotal movement of said guiding means.

23. A machine of the class described including a winding spindle, a reciprocating shaft parallel to said winding spindle, feeding mechanism for feeding a plurality of strands of wire which are adapted to be wound into layers on said winding spindle to form coils, a plurality of guiding members corresponding in number to the number of said strands of wire, means for pivotally supporting said guiding members upon said reciprocating shaft, means for effecting pivotal movement of said guiding members, and adjustable means for limiting the pivotal movement of said guiding members.

24. A machine of the class described including a pair of parallel shafts, power and gear means adapted to give rotatable motion to one of said shafts and reciprocating movement to the other of said shafts, feeding mechanism for feeding a strand of flexible material to said rotatable shaft, a guiding member pivotally supported on said reciprocating shaft for guiding said strand of flexible material to said rotatable shaft, means for effecting pivotal movement of said guiding member, and adjustable means for regulating the extent of the pivotal movement of said guiding member.

25. A machine of the class described including a rotatable shaft, a reciprocating shaft, feeding mechanism for feeding a strand of wire to said rotatable shaft, a guide member pivotally supported on said reciprocating shaft, and means for effecting lateral movement of said guide member to advance the said strand of wire in the same direction of travel as said reciprocating shaft at the beginning of each reversal of travel of said reciprocating shaft.

26. A machine of the class described including a winding spindle, reciprocating means, power and gear mechanism for effecting movement of said winding spindle and said reciprocating means, a plurality of strands of flexible material adapted to be wound upon said winding spindle to form coils, a plurality of members supported on said reciprocating means for guiding said strands of wire to said winding spindle, and adapted to assume different positions during the rotation of said winding spindle to change the winding position of said strands of wire relative to said winding spindle.

27. A machine of the class described including a winding spindle, reciprocating means, feeding mechanism for feeding strands of flexible material which are adapted to be wound into layers on said winding spindle to form coils, guiding members corresponding in number to the number of said strands carried by said reciprocating means for angularly positioning said strands of flexible material relative to said winding spindle, and automatic means for effecting individual and uniform movement of said guiding members relative to said reciprocating means to change the angular feeding position of said strands relative to said winding spindle.

28. A device of the class described including a winding spindle, a reciprocating shaft, power and gear means for effecting movement of said spindle and said shaft, feeding mechanism for feeding strands of wire to said winding spindle where said strands are wound into layers to form coils, guiding members, one for each of said strands, carried by said reciprocating shaft for guiding said strands to said winding spindle, and means for uniformly and simultaneously moving said guiding members laterally relative to said reciprocating means and said winding spindle at the beginning of each reversal of travel of said reciprocating shaft.

29. A device of the class described including a winding spindle, a reciprocating shaft, power and gear means for effecting movement of said spindle and said shaft, feeding mechanism for feeding strands of wire to said winding spindle, whereby said strands are wound into layers to form coils, guiding members, one for each of said strands, carried by said reciprocating shaft for guiding said strands to said winding spindle, means for uniformly and simultaneously moving said guiding members laterally relative to said reciprocating means and said winding spindle at the beginning of each reversal of travel of said reciprocating shaft during the operation of said machine, and adjustable means for regulating the degree of alteration of said guiding means.

30. A machine of the class described including a winding spindle, a reciprocating shaft, power and gear mechanism for effecting movement of said spindle and said shaft, feeding mechanism for feeding strands of flexible material to said winding spindle where said strands are wound into layers, a plurality of guiding members pivotally supported on said reciprocating shaft and operatively connected together for guiding said strands to said winding spindle, control means supported on said reciprocating shaft and associated with one of said guiding members, frictional means, a connecting member for operatively interconnecting said control means and said frictional means, said frictional means and said control means adapted during the operation of said machine to alter the angular relation of said guiding members whereby the feeding angular position of said strands are altered during the winding of said layers.

31. A machine of the class described including a winding spindle, a reciprocating shaft, means for effecting movement of said spindle and said shaft, feeding mechanism for feeding strands of wire to said winding spindle where the same is wound into layers, guiding members supported on said reciprocating shaft and corresponding in number to the number of said strands, said guiding members being operatively connected together, controlling means associated with one of said guiding members, frictional means, means for operatively connecting said controlling means with said frictional means, said last three means operable upon each new directional movement of said reciprocating shaft to simultaneously change the angular position of said guiding members relative to said winding spindle and said reciprocating shaft to prevent overlapping of said strands of wire in forming said layers.

32. A machine of the class described including a winding spindle, a reciprocating shaft, means for effecting movement of said spindle and said shaft, feeding mechanism for feeding strands of wire to said winding spindle where the same is wound into layers, guiding members supported on said reciprocating shaft and corresponding in number to the number of said strands, said guiding members being operatively connected together, controlling means associated with one of said guiding members, frictional means, means for operatively connecting said controlling means with said frictional means, said last three means operable upon each new directional movement of said reciprocating shaft to simultaneously change the angular position of said guiding members relative to said winding spindle and said reciprocating shaft to prevent overlapping of said strands of wire in forming said layers, and adjustable means associated with said one guiding member for regulating the degree of change of the angular position of said guiding members.

Signed by me at Chicago, in the county of Cook and State of Illinois, this 1st day of June, 1922.

MARTIN B. GROUT.